US010245759B2

(12) United States Patent
Stillwell et al.

(10) Patent No.: US 10,245,759 B2
(45) Date of Patent: Apr. 2, 2019

(54) MOULDING MACHINE AND PROCESS FOR FORMING A MOULD

(75) Inventors: Nicholas Stillwell, Wiltshire (GB); Alfred Rodlsberger, Piesendorf (AT)

(73) Assignee: UPCYCLE HOLDINGS LIMITED (GB)

( * ) Notice: Subject to any disclaimer, the term of this patent is extended or adjusted under 35 U.S.C. 154(b) by 906 days.

(21) Appl. No.: 13/634,345

(22) PCT Filed: Mar. 21, 2011

(86) PCT No.: PCT/GB2011/000394
§ 371 (c)(1),
(2), (4) Date: Sep. 12, 2012

(87) PCT Pub. No.: WO2011/114119
PCT Pub. Date: Sep. 22, 2011

(65) Prior Publication Data
US 2013/0004698 A1 Jan. 3, 2013

(30) Foreign Application Priority Data
Mar. 19, 2010 (GB) .................................. 1004682.9

(51) Int. Cl.
*B29C 33/04* (2006.01)
*B29C 33/30* (2006.01)
(Continued)

(52) U.S. Cl.
CPC .............. *B29C 33/04* (2013.01); *B29C 33/26* (2013.01); *B29C 33/30* (2013.01); *B23P 15/00* (2013.01);
(Continued)

(58) Field of Classification Search
CPC ........... B22C 9/06; B22C 9/062; B22C 9/065; B23B 41/02; B23P 15/00; B23P 15/007;
(Continued)

(56) References Cited

U.S. PATENT DOCUMENTS 3,632,249 A * 1/1972 Pearson .................... 425/151
3,871,811 A * 3/1975 Barry et al. ............... 425/407
(Continued)

FOREIGN PATENT DOCUMENTS

CN 201183296 Y * 1/2009 ............ B29C 33/04
DE 1704224 A1 5/1971
(Continued)

OTHER PUBLICATIONS

Translation of CN201183296Y.*
(Continued)

*Primary Examiner* — Matthew P Travers
(74) *Attorney, Agent, or Firm* — Luedeka Neely Group, PC

(57) ABSTRACT

A molding machine comprises first and second non-complementary molds (20a, 20b). The first mold (20a) defines a female mold cavity (36). The second mold (20b) defines a flat molding surface (30). The first and second molds (20a, 20b) are movable between a first position in which the molds are apart and the female mold cavity (36) and the flat molding surface (30) both face upwards, and a second position in which the molds are brought together and the flat molding surface faces into and closes the female mold cavity to form a completely enclosed cavity. Each mold (20a, 20b) has a plurality of bores (22) formed through it and with an opening (24) at each end. At least two of the bores (22) are connected to each other by a block (38) positioned over the opening at one end of one bore and the opening at the end of another bore. The block (38) is formed with a groove (40) which connects the openings to each other.

11 Claims, 4 Drawing Sheets

(51) Int. Cl.
  *B29C 33/26* (2006.01)
  *B23P 15/00* (2006.01)
(52) U.S. Cl.
  CPC ... *B29C 2033/042* (2013.01); *Y10T 29/49826* (2015.01); *Y10T 428/23* (2015.01)
(58) Field of Classification Search
  CPC ............... B29C 33/0088; B29C 33/04; B29C 2033/042; B29C 33/12; B29C 33/26; B29C 33/28; B29C 33/30; B29C 33/301; B29C 33/306; B29C 33/307; B29C 35/007; B29C 35/0294; Y10T 29/49995; Y10T 428/23
  See application file for complete search history.

(56) References Cited

U.S. PATENT DOCUMENTS

| | | | | |
|---|---|---|---|---|
| 3,876,358 | A * | 4/1975 | Farrell | 425/548 |
| 4,003,687 | A * | 1/1977 | Hedin | 425/406 |
| 4,245,811 | A * | 1/1981 | Brunner et al. | 249/80 |
| 5,248,250 | A * | 9/1993 | Adachi | 425/547 |
| 5,658,522 | A | 8/1997 | Fischer | |
| 5,662,948 | A * | 9/1997 | Sjoberg | 425/195 |
| 5,795,529 | A * | 8/1998 | Reid, Jr. | 264/293 |
| 6,852,264 | B2 * | 2/2005 | Ouellette | 264/328.1 |
| 2005/0069600 | A1* | 3/2005 | Scolamiero et al. | 425/149 |
| 2009/0320547 | A1* | 12/2009 | Horton et al. | 72/342.3 |
| 2010/0040719 | A1* | 2/2010 | Lin et al. | 425/144 |
| 2011/0074201 | A1* | 3/2011 | Parker et al. | 297/452.1 |
| 2011/0081516 | A1* | 4/2011 | Stillwell et al. | 428/71 |

FOREIGN PATENT DOCUMENTS

| | | | |
|---|---|---|---|
| GB | 2460838 | 12/2009 | |
| GB | 2460838 A * | 12/2009 | ............. B29C 33/26 |
| JP | 59182706 A * | 10/1984 | ............. B29C 1/00 |
| JP | H02012808 | 1/1990 | |
| JP | H09500064 | 1/1997 | |
| WO | 2004052579 A1 | 6/2004 | |

OTHER PUBLICATIONS

JPS59182706A Human Translation, produced Feb. 2015.*
International Preliminary Report on Patentability dated Oct. 4, 2012, PCT/GB2011/000394 Written Opinion on the International Searching Authority (8 pages).

* cited by examiner

MOULDING MACHINE AND PROCESS FOR FORMING A MOULD

CROSS-REFERENCE TO RELATED APPLICATION

This application claims priority under all applicable statutes, and is a U.S. National phase (37 USC Section 371) of International Application PCT/GB2011/000394, filed Mar. 21, 2011, and entitled A MOULDING MACHINE AND PROCESS FOR FORMING A MOULD, which claims priority to GB 1004682.9, filed Mar, 19, 2010, incorporated herein by reference in their entireties The present invention relates to a moulding machine and a process for forming a mould for use in making moulded plastic articles. In particular, it relates to a simple and inexpensive process for forming a mould which can be heated and cooled by conduction.

The process is suitable for creating a mould for any type of moulding machine which requires heating and/or cooling of the mould. However, it is particularly suitable for a mould for use in the type of moulding process described in GB 2460838. This process uses a pair of female moulds, movable between open and closed positions. When closed, the moulds define a completely closed mould cavity. The process involves heating the moulds by conduction while the moulds are open, forming a plastic skin in each open mould, placing an expandable filler material in one mould and only then closing the moulds, whereupon the skins bond together to form a continuous outer skin and the filler expands to fill the volume within the skin. The moulds are subsequently cooled by conduction before opening and removing the moulded article.

Conveniently, to efficiently provide heating and cooling, each mould is formed with a network of internal channels through which heated or cooled fluid, such as oil, can be circulated. Typically, to do this each mould is formed as a sandwich construction of two metal bodies. Each body has a network of channels cut into one surface. For example, there may be a serpentine channel with a single inlet and single outlet. The channels formed in one body are arranged in a mirror image to those of the other body. The channels may be cut by a CNC milling process for example. Both bodies are then sandwiched together, with a gasket between them for sealing, so that the channels in each body co-operate with those in the opposing body to form a mould with an internal channel running through it. However, such a process is fairly complex, time consuming and expensive due to the need for precision cutting of the channels. Additionally, such moulds may leak or experience blockages in the channels if the gasket fails. If this occurs, the entire mould must be dismantled to identify and deal with the problem.

Furthermore, it is difficult to accurately control the heating/cooling of the mould when a long channel is formed, especially if there is a single continuous channel extending through the whole mould. This can lead to an uneven temperature distribution in the mould, resulting in problems in the quality and reliability of plastic articles formed in the mould.

The present invention addresses these problems and limitations of the prior art.

The present invention provides a moulding machine comprising first and second non-complementary moulds, the first mould defining a female mould cavity and the second mould defining a flat moulding surface, wherein the first and second moulds are movable between a first position in which the moulds are apart and the female mould cavity and the flat moulding surface both face upwards, and a second position in which the moulds are brought together and the flat moulding surface faces into and closes the female mould cavity to form a completely enclosed cavity, and wherein each mould has a plurality of bores formed through it with an opening at each end, and at least two of the bores are connected to each other by a block positioned over the opening at one end of one bore and the opening at the end of another bore, the block being formed with a groove which connects the openings to each other.

Preferably each bore is connected to each adjacent bore by a block formed with a groove.

A groove may also be formed in the mould between the openings of adjacent bores which cooperates with the groove in a block to create a larger channel between the bores.

Preferably the or each groove is formed with a first end, a second end and a constriction therebetween.

In one embodiment the first mould comprises a body having a flat moulding surface and one or more frame members secured to the flat moulding surface in order to define a female mould cavity.

In this case, the or each frame member may be releasably secured to the flat moulding surface.

The first and second moulds may be hingedly connected together for pivotal movement between the first position and the second position, and wherein the hinge is adjustable to accommodate one or more frame members of different thickness between the two moulds in the closed position.

The present invention also provides a process for creating a mould, comprising providing a solid body having at least one surface which defines a moulding surface against which an item is to be moulded in use, and forming at least two bores through the body with an opening at each end and which does not intersect the moulding surface, connecting two or more bores together by placing a connecting element between an opening at one end of one bore and an opening at one end of another bore, wherein the connecting element comprises a grooved block, the groove defining a channel between the two bores.

Preferably each bore is formed by drilling.

The bores may be parallel to each other, and may be equally spaced from each other.

The bores may not all have the same diameter.

Preferably the diameter of each bore is in the range of 10-15 millimeters.

The present invention also provides an article formed in a moulding machine, or in a mould, as described above.

The invention will now be described in detail by way of example only, with reference to the accompanying drawings in which.

Figure 1:
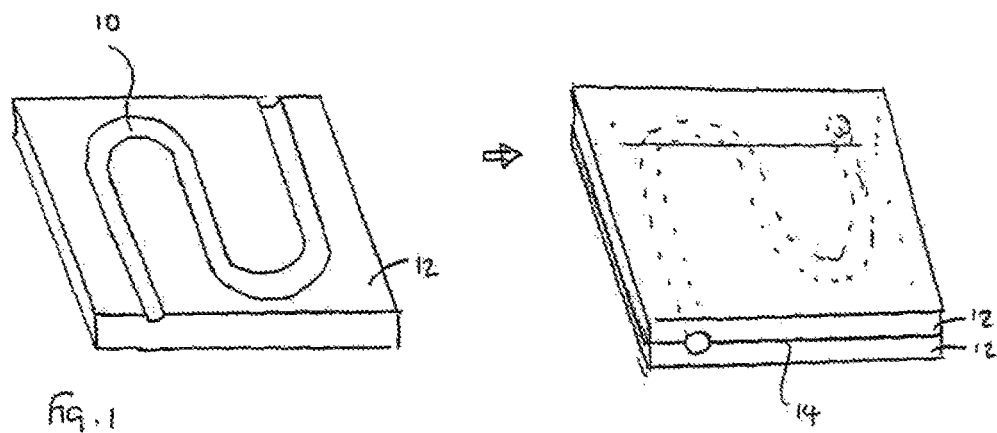
FIG. 1 is a simplified perspective view of a prior art mould formed by two bodies and a gasket.

FIG. 1 shows a prior art process for creating a mould with an internal channel. As described above, a corresponding network of channels 10 is formed in a surface of each of two bodies 12. One body is inverted and placed on top of the other so that the channels co-operate to define a single internal channel through the structure. A gasket 14 is placed between the two bodies 12. A surface of one body, opposed to that containing the channel, will define a moulding surface against which a moulded article will be created when the mould is in use.

Figure 2:
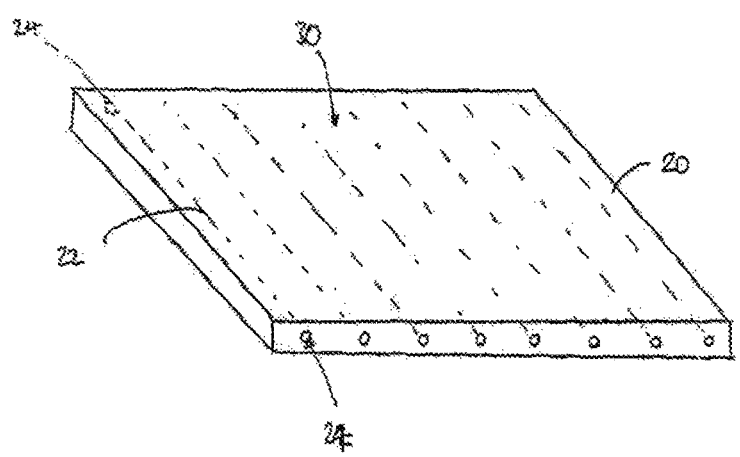
FIG. 2 is a perspective view of a mould produced in accordance with the process of the present invention, at an intermediate stage of the process.

In the present invention, a mould with internal channels is created from a single body of material 20 as shown in FIG. 2. For simplicity and clarity this is illustrated as a single rectangular slab or plate. In use, one surface 30 of the body will define a moulding surface against which part of an article will be formed when the mould is in use. For example, the upper surface 30 as illustrated may in fact be shaped rather than flat, to define a female mould cavity or a male mould projection for co-operating with another mould in use.

The body 20 is formed of any conductive material suitable for forming a mould, typically a metal such as steel.

A series of separate bores 22 are formed through the body 20, extending from one side all the way through to the other. In this example, a series of equispaced, parallel bores 22 of equal diameter extends across the whole body 20, although other configurations are possible. Thus, each bore 22 has an opening 24 at each end, and the bores 22 do not intersect the moulding surface 30.

The bores 22 may be formed by any convenient process but the currently preferred option is deep drilling using a drill bit long enough to pass all the way through the body 20.

In a typical example mould, the body 20 measures 1,300 mm by 2,600 mm and is 20 mm thick. The bores 22 are 12 mm in diameter and the spacing between the centre lines of adjacent bores 22 is 36 mm.

Thus, the bores 22 can be formed in a straightforward and inexpensive manner. To create interconnections between the bores 22, connecting tubes 26 can be placed between the openings 24 at the ends of two bores 22. This may be a simple U-shaped length of stainless steel tubing secured into each opening 24 and provided with a seal 28 to prevent leakage of fluid out of the bores 22.

Figure 3:
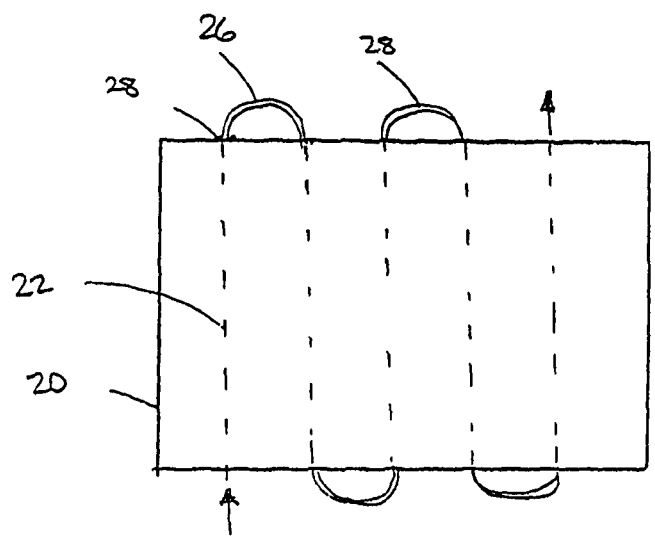
FIG. 3 is a perspective view of a finished mould, with the bores interconnected in one configuration.

As shown in FIG. 3, connecting tubes 26 may be placed between adjacent openings 24 alternately on each side of the body 20, so that the end result is a continuous serpentine channel equivalent to that in the prior art arrangement of FIG. 1.

Figure 4:
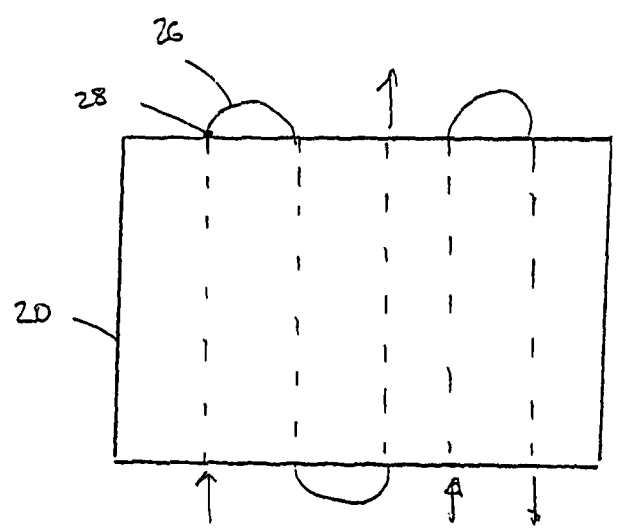
FIG. 4 is similar to FIG. 3 but shows the bores interconnected in an alternative configuration.

A versatile mould in which the channel configuration can be altered can be provided by changing the position of the connecting tubes 26. For example, in FIG. 4, pairs of channels 22 are connected at one end by a connecting tube 26, while the opposite ends form the inlet and outlet. Groups of two, or more bores 22 can be connected in this way so that there are a number of separate channels extending through the mould. It will be appreciated that many other configurations are possible. Each bore 22 may be kept completely separate with fluid simply entering at one end and exiting the other. Non-adjacent channels may be connected by a connection tube which bypasses one or more channels and so on.

By altering the channel configuration in this way, it is possible to control the heating/cooling of the mould. Using shorter channel lengths such as in the FIG. 4 configuration enables more uniform heating/cooling to be achieved because there is a smaller temperature gradient between the temperature of the fluid at the inlet and the temperature at the outlet. Alternatively, some parts of the mould may be heated/cooled more than other parts by circulating fluid through relevant channels at different temperatures and/or at different flow rates. It would also be possible to heat some areas whilst cooling others. Some channels may be simply left open without circulating fluid therethrough and so on.

Figure 5:
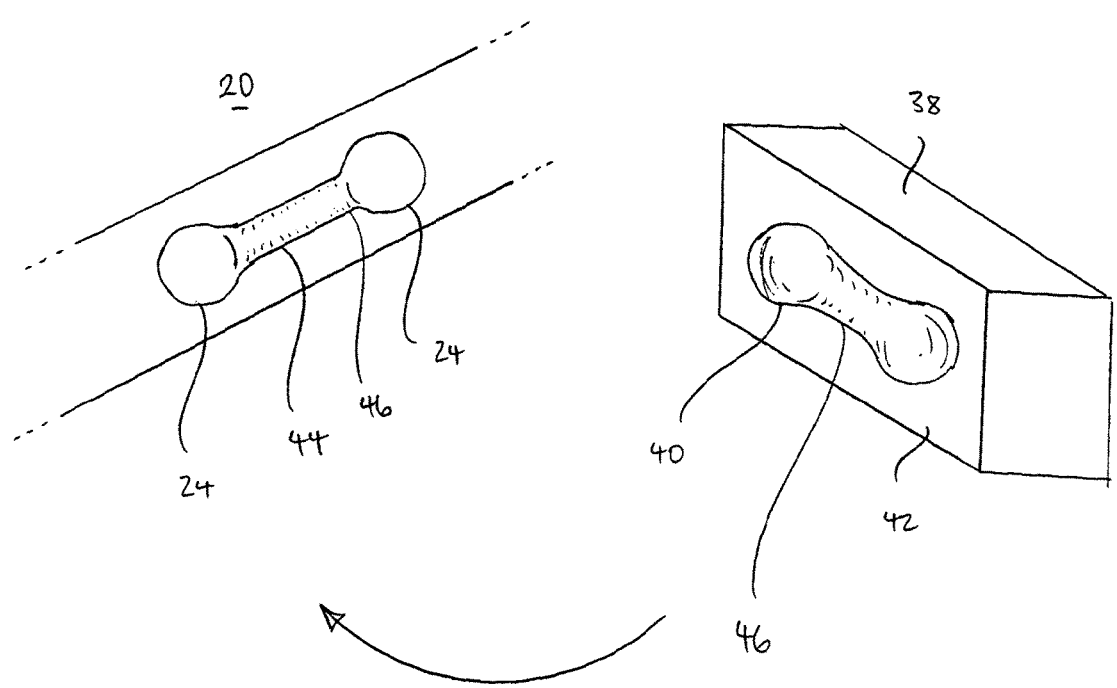
FIG. 5 is a detail view of how two bores may be interconnected by a grooved block.
Figure 6:
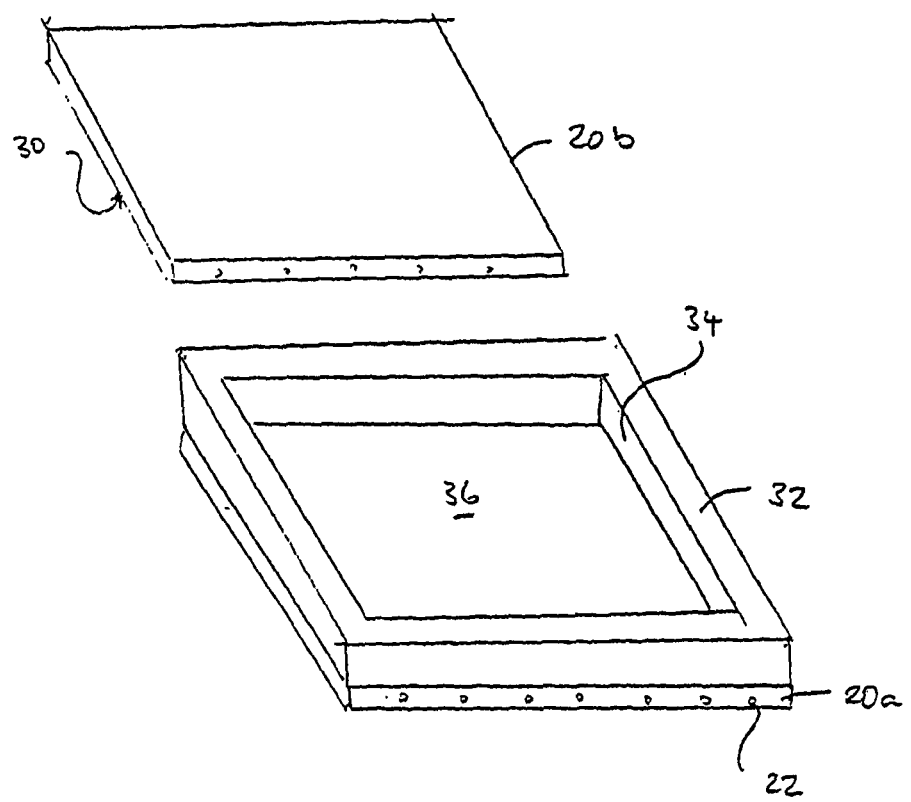
FIG. 6 illustrates how two moulds produced in accordance for the present invention can be combined to form a completely enclosed mould cavity.

In accordance with the present invention, as an alternative to using connecting tubes 26, adjacent bores 22 are interconnected by use of a connecting block 38 as shown in FIG. 5. Each block 38 consists of a solid block of material with a groove 40 milled, or otherwise formed, in one surface 42 thereof. On the mould 20, preferably a corresponding groove 44 is milled or otherwise formed between the openings 24 of adjacent bores 22. The surface 42 of the block 38 is placed against the mould 20 with the grooves 40 and 44 aligned with each other so that together they form a channel communicating between the two bores 22.

A seal or gasket may be placed between the blocks 38 and the mould 20.

The use of a connecting block 38 has significant advantages over a connecting tube 26. The body of the block 38 will be heated (or cooled) by the circulating fluid and unlike a thin walled tube, the block 38 will retain its temperature and suffer far smaller losses. Therefore, the fluid itself maintains an even temperature as it passes through the mould 20 and blocks 38. This in turn ensures an even temperature distribution across the whole moulding surface of the mould 20 which is important in ensuring consistent quality of the moulded product.

Preferably, the groove 40 in the block 38, and the corresponding groove 44 in the mould 20 if present, are formed at each end to correspond to the size and shape of the opening 24 to provide a smooth path for the fluid. However, preferably each groove 40, 44 is formed with a constriction 46 between the two ends so that the flowpath narrows and then widens again. As fluid flows through this constriction its velocity increases in accordance with the Venturi effect this has the effect of maintaining the overall flow rate of fluid so that the fluid is circulated efficiently.

A further advantage of a mould formed by the process of the present invention is that if any of the seals or gaskets fail, it is easy to remove the relevant connecting block 38 and replace it, unlike the large-area gasket arrangement of the prior art. Similarly, should any bore 22 somehow become blocked, it is straightforward to remove the relevant connecting block 38 and clean the bore 22.

Thus, a very simple, cost effective process is provided for forming a mould which can be heated or cooled by circulation of fluid therethrough in a network of internal channels. The mould is cheaper to manufacture and more versatile than prior art moulds because the channels are easier to create and to seal and their configuration can be altered by interconnecting channels in different ways.

As mentioned above, the process of the present invention is particularly useful for creating moulds for use in the process described in GB2460838, in which a pair of female moulds can be closed to form a completely enclosed mould cavity. In another aspect of the present invention, a simplified mould for use in this type of process can be provided by using a single female mould in conjunction with a flat moulding surface to form a lid.

In particular, each mould may consist of a body 20 formed with bores 22 as described above. One mould consists of a body which defines a female mould cavity. This may be created in any conventional manner or, as shown in FIG. 5, the female mould may be created from a flat body 20a with a frame 32 secured to the moulding surface 30. The frame 32 provides a perimeter wall 34 extending around an area of the moulding surface 30, thereby creating a female mould cavity 36.

The frame 32 may be permanently secured to the body 20a. However, in a preferred embodiment it is releasably secured to the body 20a, for example with mechanical fasteners or some form of mechanical clamping arrangement. In this way, multiple frames 32 can be stacked on top of each other to create a deeper mould cavity, or the frame 32 can be removed and replaced by another frame of different dimensions to create a female mould cavity 36 with a different base area, and/or a different depth. The shape of the frame 32 and thus the shape of the mould cavity 36 it creates can also be varied. The frame 32 could be subdivided to form two or more smaller mould cavities.

The other mould is simply another body 20b, with bores 22, and without such a frame 32 and thus providing a flat moulding surface 30. This can be placed on the top of the female mould, with the moulding surface 30 facing into the mould cavity 36 thereby acting as a lid to form a completely enclosed cavity. Thus, a closable mould can be created easily and quickly and can be adapted to provide different sizes and shapes of mould cavity as required. Such a versatile mould is therefore extremely cost effective.

Conveniently, the two bodies 20a and 20b may be hingedly connected together for easy opening and closing of the mould cavity 36. In order to accommodate one or more frames 32 of different thickness, the hinge may be adjustable (in a known manner) to alter the spacing between bodies 20a and 20b when they are in the closed position so that the distance between them, and thus the thickness of the frame 32 which can be accommodated, can be altered as necessary.

In use, the moulds 20a,b are initially open with both the female mould cavity 36 and the flat moulding surface 30 facing upwards. In accordance with the process described in GB 2460838, the moulds 20a,b can be heated by passing heated fluid through the bores 22 and blocks 38. Particulate material can be applied to the female mould cavity 36 and the flat moulding surface 30, which then melts to form a plastic skin. Filler material can be placed within the plastic skin in the female mould cavity 36. The flat moulding surface 30 is rotated by 180° about the hinges to bring the moulds 20a,b together. The plastic skin on the flat moulding surface 30 adheres to the surface while it is hot and therefore allows this rotation of the mould 20b. The flat moulding surface 30 becomes a lid, facing into and closing the female mould cavity 36 to provide a completely enclosed mould cavity. Once closed, the skins bond together to form a continuous shell completely encasing the filler material.

Thus, the mould and moulding machine of the present invention are simple and cost effective to manufacture and, in particular, are ideally suited to producing flat panel moulded articles having a continuous outer skin surrounding a filler material. It will of course be appreciated that various changes and modifications can be made to the apparatus and process as described without departing from the scope of the claims.

The invention claimed is:

1. A moulding machine comprising first and second non-complementary moulds, the first mould defining a female mould cavity and the second mould defining a flat moulding surface, wherein the first and second moulds are movable between a first position in which the moulds are apart and the female mould cavity and the flat moulding surface both face upwards, and a second position in which the moulds are brought together and the flat moulding surface faces into and closes the female mould cavity to form a completely enclosed cavity, and wherein each mould has a plurality of bores formed through it with an opening at each end configured for receiving flow of a mould cooling or heating fluid, and at least two of the bores are connected to each other by a block over the opening at one end of one bore and the opening at the end of another bore, the block having a mould facing surface and being formed with a groove defined on the mould facing surface which connects the openings to each other, wherein the or each groove is formed with a first end, a second end, and a constriction therebetween such that the flow path of the or each groove first narrows and then widens again between the first end and the second end, the constriction being configured to provide a venturi effect so that when the fluid passes through the constriction its velocity increases.

2. A moulding machine as claimed in claim 1, wherein a mould groove is formed in the mould between the openings of adjacent bores which cooperates with the groove of the block to create a larger channel between the bores.

3. A moulding machine as claimed in claim 1, wherein the first mould comprises a body having a flat moulding surface and one or more frame members secured to the flat moulding surface in order to define a female mould cavity.

4. A moulding machine as claimed in claim 3, wherein the or each frame member is releasably secured to the flat moulding surface.

5. A moulding machine as claimed in claim 4, wherein the first and second moulds are hingedly connected together for pivotal movement between the first position and the second position, and wherein the hinge is adjustable to accommodate one or more frame members of different thickness between the two moulds in the closed position.

6. A process for creating a mould, comprising providing a solid body having at least one surface which defines a moulding surface against which an item is to be moulded in use, and forming at least two bores through the body configured for receiving flow of a mould cooling or heating fluid, the bores each having an opening at each end and which does not intersect the moulding surface, connecting two or more bores together by placing a connecting element between the opening at one end of one bore and an opening at one end of another bore, wherein the connecting element comprises a grooved block, the groove defining a channel between the two bores, wherein the or each groove is formed on a mould facing exterior surface of the block with a first end, a second end, and a constriction therebetween, the constriction being configured to provide a venturi effect so that when the fluid passes through the constriction its velocity increases.

7. A process as claimed in claim 6, wherein each bore is formed by drilling.

8. A process as claimed in claim 6, wherein the bores are parallel to each other.

9. A process as claimed in claim 6, wherein the bores are equally spaced from each other.

10. A process as claimed in claim 6, wherein the bores do not all have the same diameter.

11. A process as claimed in claim 6, wherein the diameter of each bore is in the range of 10-15 millimeters.

* * * * *